(12) United States Patent
Samuel et al.

(10) Patent No.: US 11,343,134 B1
(45) Date of Patent: May 24, 2022

(54) SYSTEM AND METHOD FOR MITIGATING ANALYTICS LOADS BETWEEN HARDWARE DEVICES

(71) Applicant: DELL PRODUCTS, LP, Round Rock, TX (US)

(72) Inventors: Balasingh P. Samuel, Round Rock, TX (US); Jacob Mink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/090,376

(22) Filed: Nov. 5, 2020

(51) Int. Cl.
*G06F 15/16* (2006.01)
*H04L 41/046* (2022.01)
*H04L 43/08* (2022.01)
*H04L 67/10* (2022.01)
*G06F 16/28* (2019.01)

(52) U.S. Cl.
CPC .......... *H04L 41/046* (2013.01); *G06F 16/285* (2019.01); *H04L 43/08* (2013.01); *H04L 67/10* (2013.01)

(58) Field of Classification Search
CPC ....... H04L 41/046; H04L 67/10; H04L 43/08; G06F 16/285
See application file for complete search history.

(56) References Cited

U.S. PATENT DOCUMENTS

| 9,141,680 | B2 | 9/2015 | Bengali et al. | |
|---|---|---|---|---|
| 10,275,409 | B2 | 4/2019 | Tung et al. | |
| 2010/0162036 | A1* | 6/2010 | Linden | G06F 11/181 714/4.11 |
| 2016/0203035 | A1* | 7/2016 | Tran | G06F 11/0778 714/37 |
| 2018/0025276 | A1 | 1/2018 | Hill et al. | |
| 2018/0356792 | A1* | 12/2018 | Chao | G05B 19/41835 |

* cited by examiner

*Primary Examiner* — Padma Mundur
(74) *Attorney, Agent, or Firm* — Larson Newman, LLP

(57) ABSTRACT

An information handling system includes a cloud device including an on-the-cloud analytics device, and a node device. The node device includes an on-the-box analytics device, a data collector device, a data management device, and a load mitigator device. The data collector device sources a plurality of data-producing agents within the information handling system. The data management device receives and manages data produced by the data collector. The load mitigator device receives the data from the data management device, and analyzes the data and additional system data. The additional system data is associated with the information handling system. The load mitigator device also determines whether to route analytics for the information handling system to the on-the box analytics device or to the on-the-cloud analytics. Based on the determination, the load mitigator device routes the analytics to either the on-the box analytics device or to the on-the-cloud analytics device.

18 Claims, 4 Drawing Sheets

SYSTEM AND METHOD FOR MITIGATING ANALYTICS LOADS BETWEEN HARDWARE DEVICES

FIELD OF THE DISCLOSURE

The present disclosure generally relates to information handling systems, and more particularly relates to mitigating analytics loads between hardware devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a cloud device including an on-the-cloud analytics device, and a node device. The node device includes an on-the-box analytics device, a data collector device, a data management device, and a load mitigator device. The data collector device may source a plurality of data-producing agents within the information handling system. The data management device may receive and manage data produced by the data collector. The load mitigator device may receive the data from the data management device, and may analyze the data and additional system data. The additional system data may be associated with the information handling system. The load mitigator device may also determine whether to route analytics for the information handling system to the on-the box analytics device or to the on-the-cloud analytics. Based on the determination, the load mitigator device may route the analytics to either the on-the box analytics device or to the on-the-cloud analytics device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
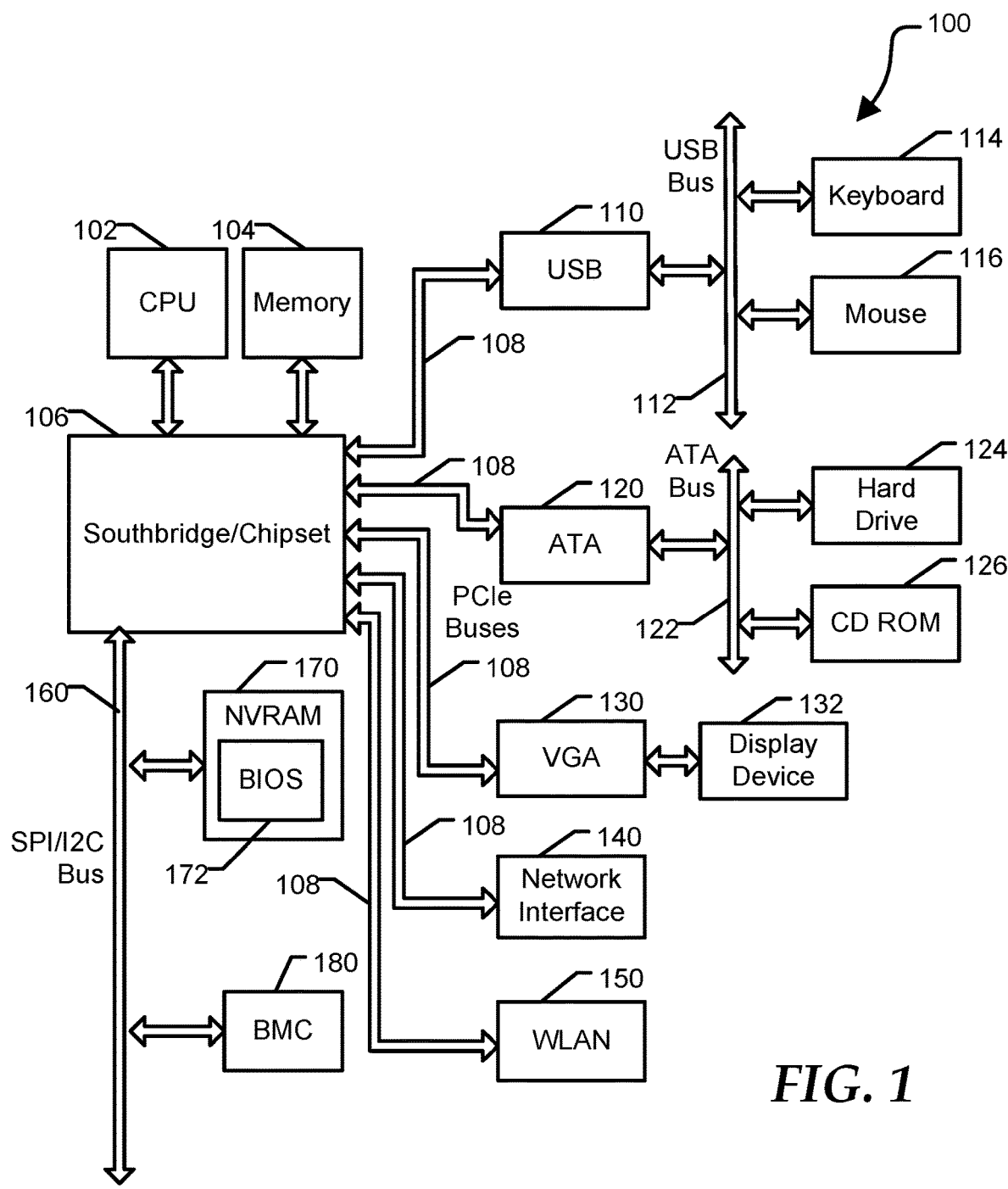
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 100 may be any suitable device including, but not limited to, information handling system 100 and servers 112, 114, and 116 of FIG. 1. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
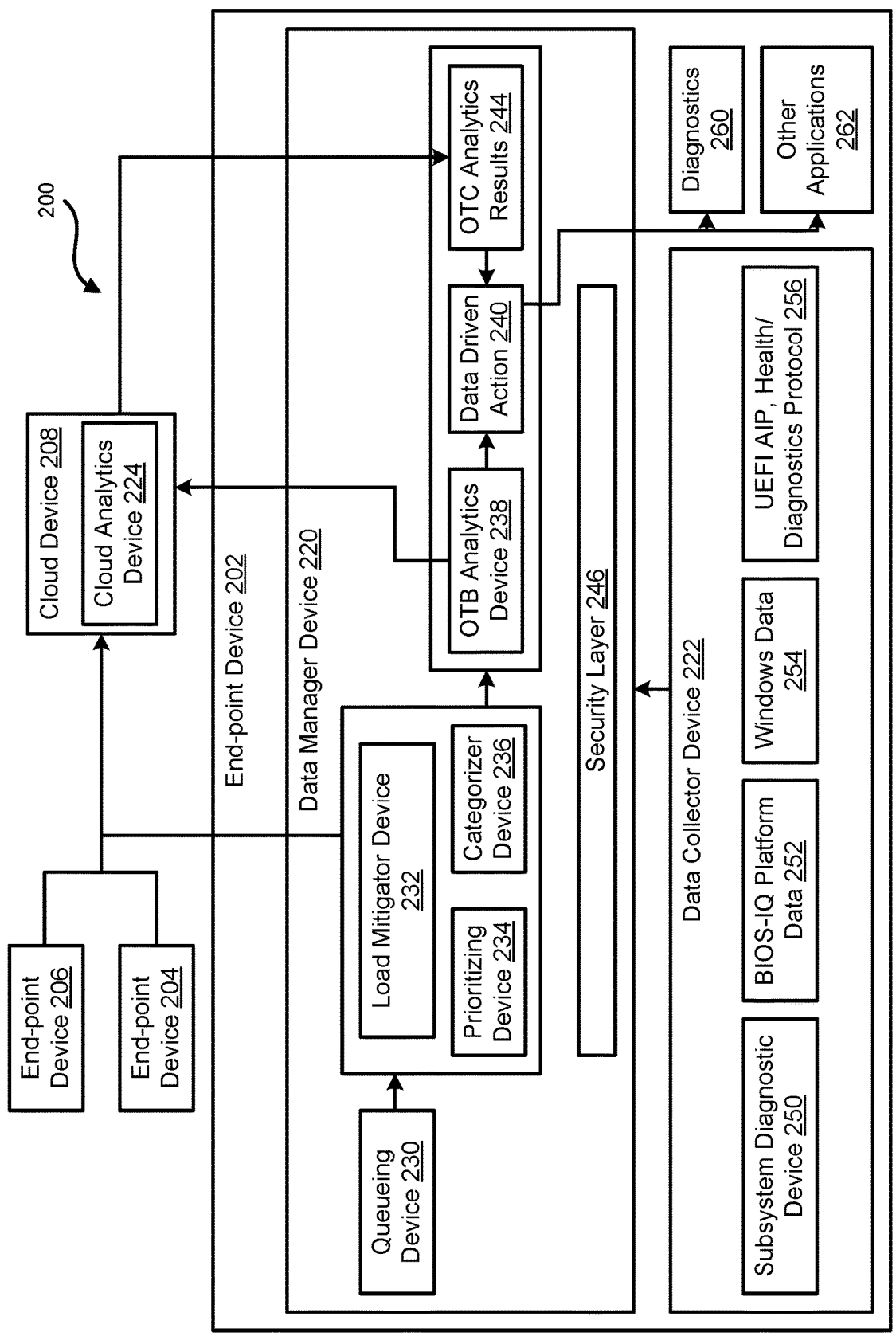
FIG. 2 is a diagram of a portion of an information handling system according to at least one embodiment of the present disclosure.

FIG. 2 illustrates an information handling system 200 including end-point or node devices 202, 204, and 206, and a cloud device 208 according to at least one embodiment of the present disclosure. In an example, each of end-point devices 202, 204, and 206 may include substantially the same components and may perform substantially the same operations. For clarity and brevity the operations will only be described with respect to end-point device 202. End-point device 202 includes a data manager device 220 and a data collector device 222. Cloud device 208 includes a cloud analytics device 224. Data manager device 220 includes a queueing device 230, a load mitigator device 232, a prioritizing device 236, an on-the-box (OTB) analytics device 238, a data driven action 240, an on-the-cloud (OTC) analytics results 244, and a security layer 246. Data collector device 222 includes a subsystem diagnostic device 250, a basic input/output device (BIOS)-IQ platform data 252, windows data 254, and an UEFI AIP health diagnostics protocol 256. In an example, any device herein including, but not limited to, data manager device 220, queueing device 230, load mitigator device 232, prioritizing device 236, OTB analytics device 238, may be any suitable device or component. For example, a device may include, but is not limited to, a hardware device, a module, and software to be executed by a processor. The hardware device may be any suitable device including, but not limited to, a field programmable gate array (FPGA), a processor device, and other hardware circuitry. In certain examples, cloud device 208, data manager device 220, and data collector device 222 may include any suitable processor device including, but not limited to, CPU 102 of FIG. 1, to perform the operations discussed herein. In an example, information handling system 200 may include additional components without varying from the scope of this disclosure.

During operation of information handling system 200, one or more components may perform data analytics for the information handling system by any suitable means. For example, the components of information handling system 200 may utilize deep learning/neural networks, artificial intelligence or the like. In an example, data analytics for information handling system 200 may be performed to diagnose and correct any possible errors, faults, crashes, or the like within the information handling system. In previous information handling systems, the data analytics operations were constricted by hardware resources and security factors. In previous information handling systems, the data analytics would be perform either always in an OTC analytics device or always in an OTB analytics device.

In these previous information handling systems, the cloud based analytics and on-the-box analytics each have drawbacks, which may reduce the efficiency or benefits of the analytics devices. For example, an OTC analytics device may increase data privacy breach problems based on the transferring of data from an end-point device to a cloud based computing device. Also, data security and management may include a higher amount of complexity in the OTC analytics device as compared to an OTB analytics device. OTC analytic devices may also introduce a time delay for calculating analytics based on latency of transmitting the data over a network to a remote node or device. An OTB analytics device may be great for security and data privacy, but may lack particular operations provided by the OTC analytics device. For example, an OTB analytics device may lack the processing power to compute rapid data analytics operations. Also, OTB analytics devices performing data analytics may affect an end user's productivity. Therefore, productivity of information handling system 200, data security and privacy, and processing power may be improved by automatically determining whether data in an analytics workload request is to be analyzed in an OTB analytics device or an OTC analytics device as described herein.

In an example, data collector device 222 receive data from any suitable number of data producing devices including, but not limited to, subsystem diagnostic device 250, BIOS-IQ platform data 252, windows data 254, and UEFI AIP health diagnostics protocol 256. For example, data from a data producing device may include a productivity heat map for end-point device 202, a resource load heat map for the end-point device, and health information about the end-point device. In certain examples, the end-point productivity heat map may be produced by a data producer learning and predicting the productivity of a user of the end-point device based on contextual data and other data points. The end-point resource load heat map may be produced by a data producer learning and predicting the loading factors for any suitable end-point resources including, but not limited to, CPU resources, GPU resources, network resources, and memory resources. In an example, data collector device 222 may produce a comprehensive health score for end-point device 202 by combining any suitable data. For example, the information or data for the health score may include, but is not limited to, memory health, hard drive health, system temperature, subsystem age, battery health, whether an application 262 crashes, and blue screen of deaths (BSODs) and the reason. Data collector device 222 may provide this data to data manager device 220 via security layer 246 of the data manager device. In an example, security layer 246 may ensure that data within end-point device 202 is secure on the end-point device and in transmission to cloud device 208.

Queueing device 230, load mitigator device 232, prioritizing device 234, and categorizer device 236 of data manager device 220 may perform one or more suitable operations to determine whether the analytics data load or workload request should be handled by OTB analytics device 238 or OTC analytics device 224 as will be described with respect to FIG. 3.

Figure 3:
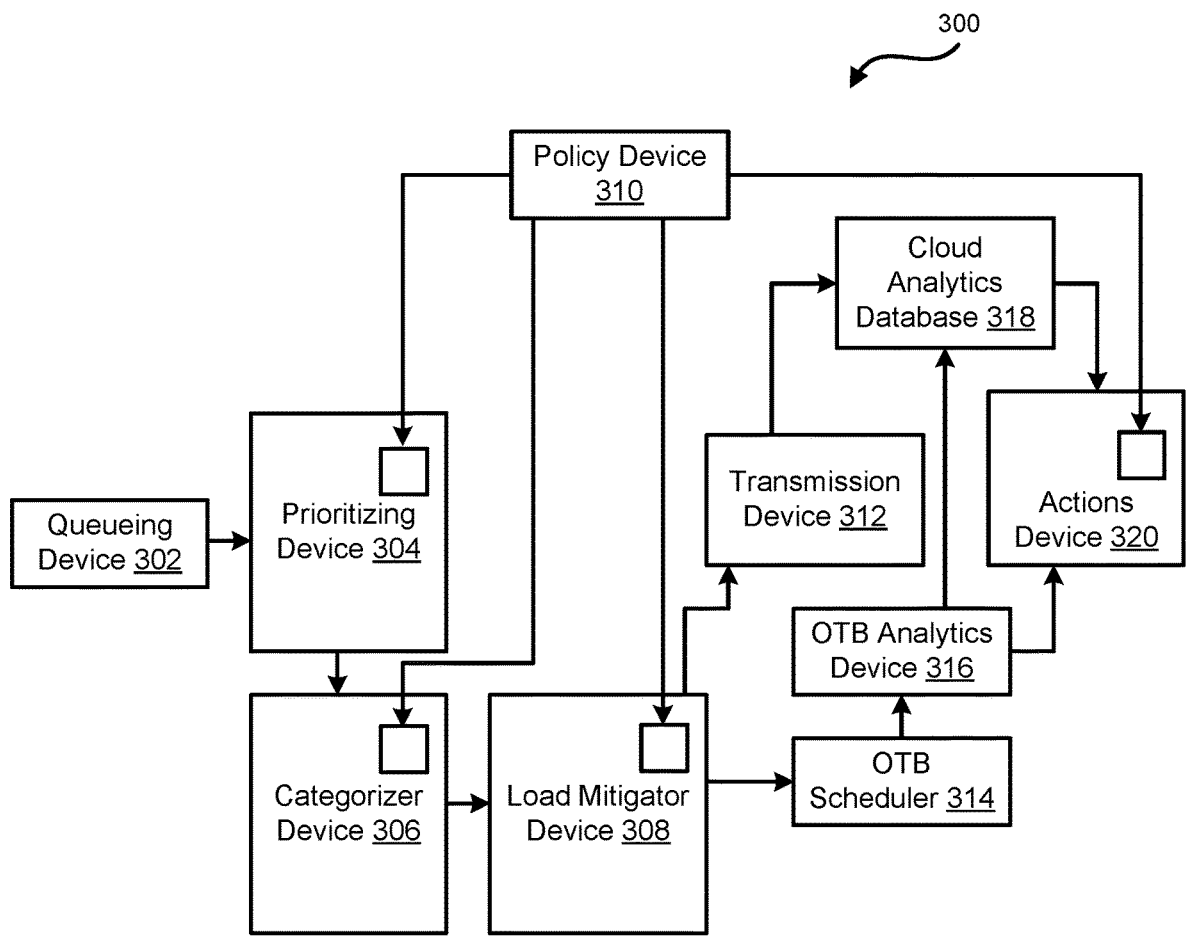
FIG. 3 is a diagram of a portion of a data manager device within an information handling system according to at least one embodiment of the present disclosure.

FIG. 3 shows a portion of a data manager device 300 within an information handling system including a queueing device 302, a prioritizing device 304, a categorizer device 306, a load mitigator device 308, a policy device 310, a transmission device 312, an OTB scheduler 314, an OTB analytics device 316, a cloud analytics database 318, and an actions device 320 according to at least one embodiment of the present disclosure. In an example, the components of data manager device 300 may be substantially similar to the components of data manager device 220 of FIG. 2, such that the operations described with respect to FIG. 3 may be performed by the components of FIG. 2 without varying from the scope of this disclosure.

Queueing device 302 may receive the analytics data from data collector 222 of FIG. 2 and may place the data in a queue. Queueing device 302 may queue the data based on one or more factors including, but not limited to, the order the data is received, an urgency level of the data, and importance level of the data producing device. In an example, policy device 310 may provide policy information to multiple devices including, but not limited to, prioritizing device 304, categorizer device 306, load mitigator device 308, and actions device 320. In response to the data being queued, the data may be provided to prioritizing device 304 in the order the data is queued.

Prioritizing device 304 may perform one or more operations to prioritize the data from queueing device 302. For example, prioritizing device 304 may utilize policy information from policy device 310, a productivity heat map. In an example, the policy information may include any suitable data including, but not limited, a user profile, pending updates for the information handling system, and current system usage. Prioritizing device 304 may then provide the data to categorizer device 306, which in turn may assign the data to any suitable category including but not limited to, private data, public data, immediate/urgent data, and retention limited data. Thus, categorizer device 306 may place the data in a private or public category and an immediate/urgent or retention limited category. In an example, private data may include any data for security and privacy of the information handling system. The public data may include data from sensors, sensors, or the like. Immediate/urgent data should be analyzed and/or purged immediately after collection, and retention limited data may be kept for a certain amount of time before the data expires based on policy.

In an example, operations of prioritizing device 304, operations of categorizer device 306, and policy information may be combined to create a function for input to load mitigator device 308. For example, the function may be represented by equation 1 below:

$$f(P, T, M_P, M_R, H) \rightarrow (r, S) \qquad \text{EQ. 1}$$

In equation 1 above, P∈{Private, Public}, T∈{Immediate/Urgent, Retention Limited}, $M_P$ is the productivity heat-map, $M_R$ is the end-point resource heat-map, H∈R is the health score, r∈{OTB, OTC}, and S∈{ASAP, At Trigger, By Expiration}.

In an example, sample policy information is shown in table 1 below:

TABLE 1

| P | T | $M_P$ | $M_R$ | H | (r, S) |
|---|---|---|---|---|---|
| Public | Immediate/Urgent | System is idle | Low usage | Good Health | (OTB, ASAP) |
| Public | Retention Limited | System is idle | High memory usage | Moderate Health | (OTC, By Expiration) |
| Private | Immediate/Urgent | User is active | High processor usage | | (OTB, On Trigger) |
| Private | Retention Limited | System is idle | Low usage | | (OTB, ASAP) |

In certain examples, load mitigator device 308 may utilize policy information, such as the policy information in Table 1, to determine whether an analytics workload is to be provided to either OTB analytics device 316 or an OTC analytics device, such as cloud analytics device 224 of FIG. 2. In an example, load mitigator device 308 may tag the workload request based on any suitable data including, but not limited to, policy information, the end-point productivity heat map data, the resource loading map data, and the end-point health score data. In certain examples, the productivity heat map may indicate whether a user is or might be in a period of high productivity during possible OTB analytics. Resource load heat map may indicate a current and expected strain on system resources. Thus, load mitigator device 308 may utilize this information to determine whether the analytics workload should be sent to an OTB analytics device or an OTC analytics device.

If load mitigator device 308 tags the workload for an OTC analytics device, the workload request is provided to transmission device 312, which in turn may provide the workload to cloud analytics database 318. In response to the workload request being sent to cloud analytics database 318, an OTC analytics device, such as cloud analytics device 224 of FIG. 2, may perform the analytics operations for the analytics workload.

Referring back to FIG. 2, OTC analytics device 224 of cloud device 208 may perform the analytics. In an example, OTC analytics device 224 may determine one or more issues for end-point device 202. For example, OTC analytics device 224 may predict a hard disk drive (HDD) failure of end-point device 202. OTC analytics device 224 may use the output (r, S) of the function shown above in EQ. 1 to prioritize cloud resources. For example, OTC analytics device 224 may prioritize in any suitable manner including, but not limited to, scheduling in a first in first out (FIFO) manner, and the may break prioritizing ties using S in the function, and an expiration value of the analytics workload.

OTC analytics device 224 may update a product support quick note (PSQN) list for the analytics. In an example, the PSQN list may be utilized to identify new issues within an information handling system, such as end-point device 202. For example, the PSQN list may identify that a fan is running too high in end-point device 202, and the PSQN may include a mitigation action of raising a threshold temperature before the fan speed is increased. In response to the PSQN list being updated, cloud device 208 may broadcast to end-points 202, 204, and 206. In an example, cloud device 208 may provide OTC analytics results 244 to data manager device 220, and the OTC analytics results may be utilized to generate a data driven action 240 by an actions device, such as actions device 320 of FIG. 3. Additionally, actions device 320 may utilize OTB analytics results as described below with respect to FIG. 3.

Referring back to FIG. 3, if load mitigator device 308 determines that the analytics workload should be performed by OTB analytics device 316, the analytics workload may be provided to OTB scheduler 314. OTB scheduler 314 may then determine based on any suitable factors when OTB analytics device 316 should perform the analytics. In an example, the suitable factors may include, but are not limited to, a current workload within end-point device 202.

In an example, OTB analytics device 316 may compare the current data with known issues found in the PSQN list to determine whether a known mitigation result is known. In an example, OTB analytics device 316 may utilize the information within the PSQN list to automatically inform actions device 320 of mitigation techniques current known and available on end-point 202. Additionally, the analytics performed by OTB analytics device 316 may be sent to could analytics database 318 for use by OTC analytics device 224 and the OTB analytics devices within end-points 204 and 206.

In an example, actions device 320 may perform one or more suitable operations to take an action based on the analytics data. For example, based on a policy and the results of the analytics, actions device 320 may change items in an information handling system, alert a user of the information handling system, or take other actions. In an example, the other actions may include, but are not limited to, changing a brightness of a display device, change a battery charge policy, alert of imminent component failure, and run specific sets of diagnostics.

Referring back to FIG. 2, data drive action device 240 may utilize the analytics results from OTB analytics device 238 and OTC analytics results 244 to perform diagnostics 260 or make changes to applications 262. Thus, load mitigator device 232 or 308 may improve an information handling system by utilizing priority of the analytics data, a category assigned to the data, and policy information to load balance the mitigation strategy in the information handling system between OTC analytics device 224 and OTB analytics device 238.

Figure 4:
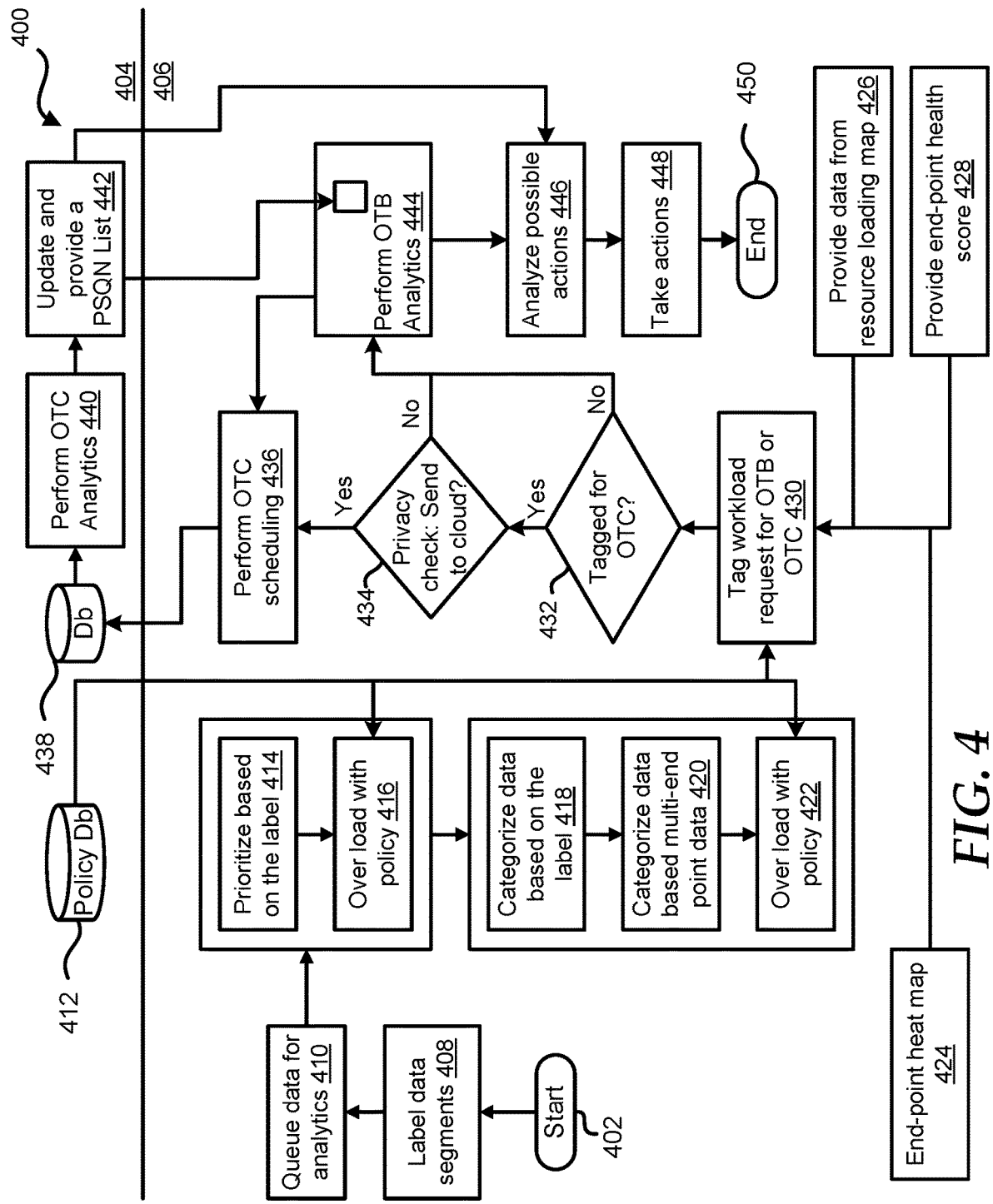
FIG. 4 is a flow diagram of a method for assigning analytics loads between an on-the-box hardware device and an off-the-box hardware device according to at least one embodiment of the present disclosure.

FIG. 4 shows a flow diagram of a method 400 for assigning analytics loads between an on-the-box hardware device and an off-the-box hardware device according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 4.

In certain examples, portions of method 400 may be performed in a cloud node 404 and other portions of the method may be performed in an end-point device 406. At block 408, data segments are labeled. In an example, a data collection device within an information handling system may label the data segments with a category and a criticality for the data segment. In certain examples, the data segments may be assigned to any suitable the category including, but not limited to, a public data category and a private data category. In an example, the data segment may be labeled as private data if the data is security and privacy data of the information handling system. The data segment may be labeled as public data based on the data being associated with sensor, diagnostics, or the like of the information handling system. Data collection device may determine whether the data segment is any suitable level of criticality including, but not limited to, immediate/urgent, and retention limited. In an example, the data segment may be labeled as immediate/urgent data based on the data needing to be analyzed and/or purged immediately after collection. The data segment may be labeled as retention limited data based on the data based on the data being able to be kept for a certain amount of time before expiring based on policy.

At block 410, the data from data collection device is queued for analytics. In an example, data collection device may receive data from multiple data producers. During the queuing operations, data from one or more producers, such as producers identified as important, may be elevated or moved up within the queue. At block 412, policy information is transmitted to multiple devices within an information handling system. At block 414, the data is prioritized based on the labels. At block 416, the prioritizing of the data is further performed based on the policy information from the policy databased in cloud node 404.

At block 418, the data is categorized based on the labels. At block 420, the data is categorized based on multiple end-point nodes data. In an example, the data from the multiple end-points may be aggregated to enable better categorizing. For example, if data indicates that a driver update caused a crash in the information handling system, the categorizing may be performed based on whether other information handling systems have experienced the same issues. At block 422, the categorizing is further performed based on policy information from the policy databased in cloud node 404.

At block 424, end-point productivity heat map data is provided. At block 426, data from a resource loading map is provided. In an example, the resource loading map may be configured by a weight of one heat map may be given more weight as compared to another heat map. At block 428, an end-point health score is provided. In an example, the health score may indicate any suitable information about the end-point including, but not limited to, subsystem health, poor CPU performance, and that the CPU is old. At block 430, a workload request for analytics is tagged for either an on-the-box analytics device or an on-the-cloud analytics device. In an example, the workload request is tagged based on any suitable data including, but not limited to, policy information, the end-point productivity heat map data, the resource loading map data, and the end-point health score data. In certain examples, workload request may be tagged for the on-the-box analytics device or the on-the-cloud analytics device by any suitable component or device including, but not limited to, a load mitigator device of the information handling system.

At block 432, a determination is made whether the workload request is tagged for the on-the-cloud analytics device. If the workload request is not tagged for the on-the-cloud analytics device, the flow continues at block 444. If the workload request is tagged for the on-the-cloud analytics device, a determination is made whether the workload request is to be sent to the cloud node based on a privacy check at block 434. In an example, the privacy check may determine whether the data in the workload request is labeled as private or public. If the workload request is not to be sent to the cloud, the flow continues as block 444. At block 438, data for the workload request is sent to a database in cloud node 404. In an example, the database in cloud node 404 may also include analytics data from other end-point nodes.

At block 440, on-the-cloud analytics are performed. In an example, the on-the-cloud analytics may be performed on the data from the workload request and on the data from the other end-point devices. In certain examples, the on-the-cloud analytics may be performed by any suitable device including, but not limited to, an on-the-cloud analytics device. At block 442, a product support quick note (PSQN) list is updated at provided to one or more devices on node device 406. For example, the PSQN may be provided to an on-the-box analytics device and an actions device. In an example, the PSQN list may include information associated with handling issues within an information handling system. For example, the PSQN list may include known mitigation techniques or operations to improve the information handling system.

At block 444, on-the-box analytics are performed. In an example, the analytics may be performed by any suitable device including, but not limited to, an on-the-box analytics device. In certain examples, the on-the box analytics may be performed on the data of the workload request, and the analytics may be performed utilizing information in the PSQN list. Additionally, the analytics performed by the on-the-box analytics device may be sent to the on-the-cloud analytics device via the action of block 436. At block 446, possible actions are analyzed. In an example, the actions may be analyzed or determined based on the determined analytics of the data within the workload request. At block 448, the determined actions are taken, and the method ends at block 450.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a cloud device including an on-the-cloud analytics device; and
    a node device to communicate with the cloud device, the node device including:
        an on-the-box analytics device;
        a data collector device to source a plurality of data-producing agents within the information handling system;
        a data management device to communicate with the data collector device, the data management device to receive and manage data produced by the data collector; and
        a load mitigator device to communicate with the data management device, the load mitigator device to:
            receive the data from the data management device;
            analyze the data and additional system data, wherein the additional system data is associated with the information handling system;
            based on the analyzed data and additional system data, determine whether to route an analytics workload associated with the analyzed data in the information handling system to the on-the box analytics device or to the on-the-cloud analytics, wherein the determination is based on a resource load heat map indicating a current and an expected strain on the information handling system resources; and
            based on the determination, route the analytics workload to either the on-the box analytics device or to the on-the-cloud analytics device.

2. The information handling system of claim 1, wherein the on-the-cloud device to produce a list of product support quick notes (PSQNs), and to provide the list of PSQNs to the node device, wherein PSQNs in the list of PSQNs are generated based on issues of the information handling system being mitigated.

3. The information handling system of claim 1, wherein the data collector device further to organize the data into immediate data and retention limited data.

4. The information handling system of claim 1, wherein the determination of whether to route the analytics workload to the on-the box analytics device or to the on-the-cloud analytics is further based on a policy within the information handling system.

5. The information handling system of claim 1, wherein the additional system data includes system load data and system health data.

6. The information handling system of claim 5, wherein the system health data is calculated based on a comprehensive health score of the information handling system.

7. The information handling system of claim 6, wherein the comprehensive health score is generated based on two or more of: memory health information, hard drive data information, system temperature information, subsystem age information, battery health information, and application crashes information.

8. A method comprising:
    sourcing, by a data collector device of a node device within an information handling system, a plurality of data-producing agents within the information handling system;
    managing, by a data management device, data produced by the data collector;
    receiving, by a load mitigator device, the data from the data management device;
    analyzing, by the load mitigator device, the data and additional system data, wherein the additional system data is associated with the information handling system;
    determining, by the load mitigator device, whether to route an analytics workload associated with the analyzed data in the information handling system to an on-the box analytics device or to an on-the-cloud analytics, wherein the determination is based on a resource load heat map indicating a current and an expected strain on the information handling system resources; and
    based on the determination, routing the analytics workload to either the on-the box analytics device or to the on-the-cloud analytics device.

9. The method of claim 8, further comprising:
producing, by the on-the-cloud device, a list of product support quick notes (PSQNs); and
providing the list of PSQNs to the node device, wherein PSQNs in the list of PSQNs are generated based on issues of the information handling system being mitigated.

10. The method of claim 8, further comprising:
organizing, by the data collector device, the data into immediate data and retention limited data.

11. The method of claim 8, wherein the determining of whether to route the analytics workload to the on-the box analytics device or to the on-the-cloud analytics is further based on a policy within the information handling system.

12. The method of claim 8, wherein the additional system data includes system load data and system health data.

13. The method of claim 12, wherein the system health data is calculated based on a comprehensive health score of the information handling system.

14. The method of claim 13, further comprising:
generating the comprehensive health score based on two or more of: memory health information, hard drive data information, system temperature information, subsystem age information, battery health information, and application crashes information.

15. A non-transitory computer-readable medium including code that when executed performs a method, the method comprising:
sourcing, by a data collector device of a node device, a plurality of data-producing agents within the information handling system;
managing, by a data management device, data produced by the data collector;
receiving, by a load mitigator device, the data from the data management device;
analyzing, by the load mitigator device, the data and additional system data, wherein the additional system data is associated with an information handling system;
determining, by the load mitigator device, whether to route an analytics workload for associated with the analyzed data in the information handling system to the on-the box analytics device or to the on-the-cloud analytics, wherein the determination is based on a resource load heat map indicating a current and an expected strain on the information handling system resources; and
based on the determination, routing the analytics workload to either the on-the box analytics device or to the on-the-cloud analytics device.

16. The non-transitory computer-readable medium of claim 15, wherein the method further comprises:
producing, by the on-the-cloud device, a list of product support quick notes (PSQNs); and
providing the list of PSQNs to the node device, wherein PSQNs in the list of PSQNs are generated based on issues of the information handling system being mitigated.

17. The non-transitory computer-readable medium of claim 15, wherein the method further comprises:
organizing, by the data collector device, the data into immediate data and retention limited data.

18. The non-transitory computer-readable medium of claim 17, wherein the determining of whether to route the analytics workload to the on-the box analytics device or to the on-the-cloud analytics is further based on a policy within the information handling system.

* * * * *